US009670905B2

(12) United States Patent
Hu et al.

(10) Patent No.: US 9,670,905 B2
(45) Date of Patent: Jun. 6, 2017

(54) PLATFORM FOR COLLECTING MARINE ENERGY SOURCES

(75) Inventors: Xiao Hu, Guangdong (CN); Jin Hu, Guangdong (CN)

(73) Assignee: Xiao Hu, Shenzhen (CN)

( * ) Notice: Subject to any disclaimer, the term of this patent is extended or adjusted under 35 U.S.C. 154(b) by 0 days.

(21) Appl. No.: 13/503,907

(22) PCT Filed: Oct. 22, 2010

(86) PCT No.: PCT/CN2010/078031

§ 371 (c)(1), (2), (4) Date: Apr. 25, 2012

(87) PCT Pub. No.: WO2011/050699

PCT Pub. Date: May 5, 2011

(65) Prior Publication Data

US 2012/0208414 A1 Aug. 16, 2012

(51) Int. Cl.
*B63B 35/44* (2006.01)
*F03D 9/00* (2016.01)

(52) U.S. Cl.
CPC .............. *F03D 9/007* (2013.01); *B63B 35/44* (2013.01); *F03D 9/008* (2013.01); *B63B 2035/446* (2013.01); *B63B 2035/4453* (2013.01); *B63B 2035/4466* (2013.01); *F05B 2240/93* (2013.01); *Y02E 10/30* (2013.01); *Y02E 10/38* (2013.01); *Y02E 10/72* (2013.01)

(58) Field of Classification Search
CPC ......... Y02E 10/38; Y02E 10/70; Y02E 10/50; Y02E 10/30; B63B 35/44; B63B 21/502; B63B 2035/4433; B63B 2035/4453; B63B 2035/4466; F03B 13/22; F03D 9/007; F03D 9/008
USPC .......................................... 114/264, 265, 121
See application file for complete search history.

(56) References Cited

U.S. PATENT DOCUMENTS

| | | | |
|---|---|---|---|
| 3,708,991 A * | 1/1973 | Barkley | 405/194 |
| 7,728,453 B2 * | 6/2010 | Evans | 290/53 |
| 2002/0182946 A1 * | 12/2002 | Tanaka | 440/6 |
| 2002/0189987 A1 * | 12/2002 | Wagner | 210/143 |
| 2009/0212562 A1 * | 8/2009 | Jaugilas | 290/42 |
| 2010/0317243 A1 * | 12/2010 | Snow | 440/6 |

* cited by examiner

*Primary Examiner* — Andrew Polay
(74) *Attorney, Agent, or Firm* — Jackson IPG PLLC; Demian K. Jackson

(57) ABSTRACT

The invention relates to a platform for collecting marine energy sources, which comprises solar energy collecting devices, wind energy generating devices and tidal generating devices. The platform also comprises electric energy gathering devices for gathering and outputting electric energy output by the collecting devices or the generating devices. The devices are arranged on the platform on the sea surface. The platform comprises a support partially submerged under the sea surface, a table arranged on the support, and a mounting bracket arranged on the table and used for placing the solar energy collecting devices and the wind energy generating devices.

4 Claims, 1 Drawing Sheet

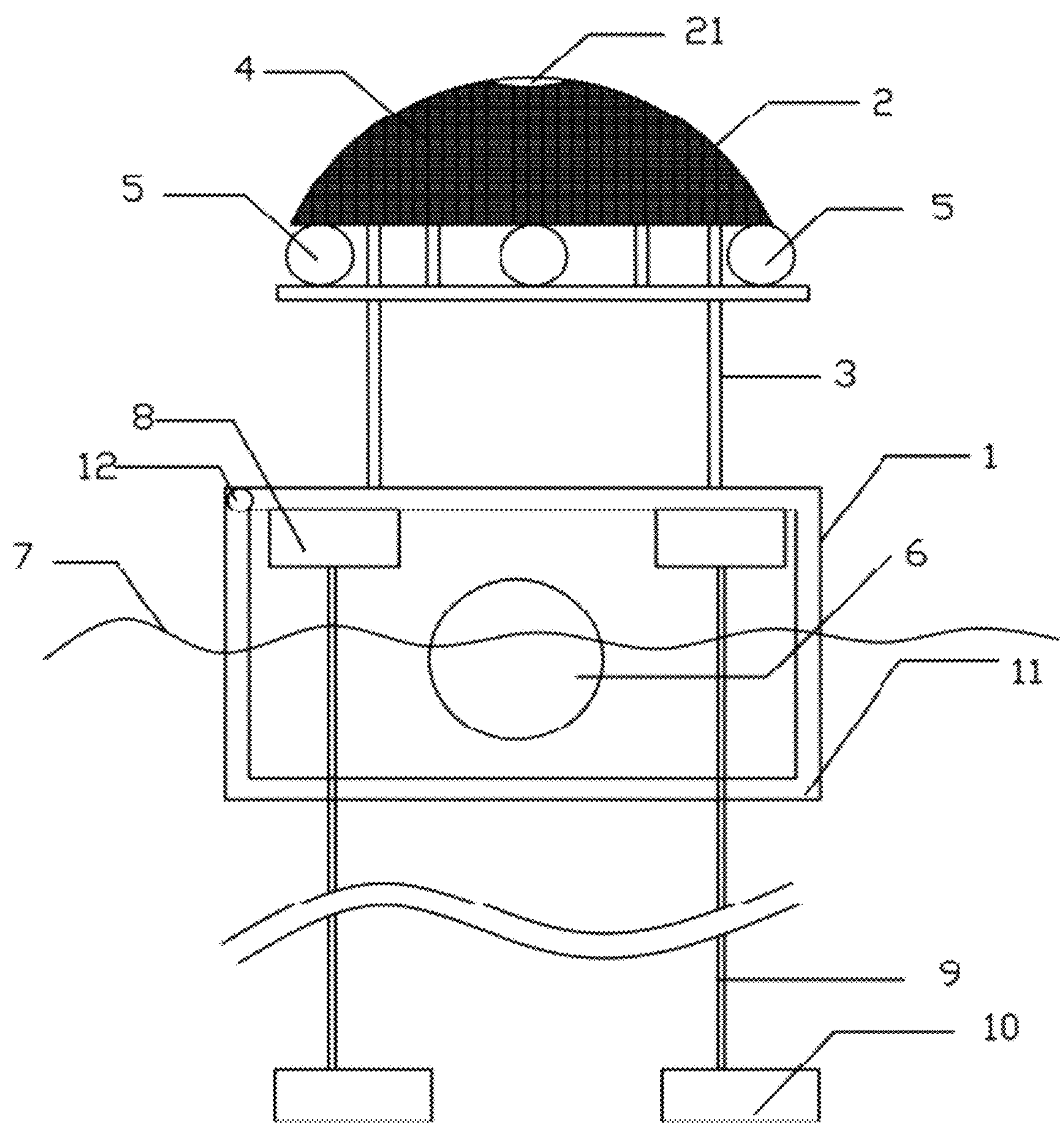
21
4
2
5
5
3
8
12
1
7
6
11
9
10

PLATFORM FOR COLLECTING MARINE ENERGY SOURCES

FIELD OF THE INVENTION

The invention relates to the energy field, in particular to a platform for collecting marine energy sources.

BACKGROUND OF THE INVENTION

In the prior art, there are a plurality of methods to obtain energy sources by elements independently, for example, solar power generation and wind power generation. Energy sources on the sea surface and particularly the offshore sea surface have more energy varieties and stronger energy compared with other places. However, the technologies for obtaining the energy sources generally need to occupy the land surface. Moreover, most technologies in the prior art only provide a single energy conversion means, so corresponding conversion mechanisms must be set respectively when energy requiring more means must be obtained, thus the traditional energy collection or conversion means must occupy less land surface respectively.

SUMMARY OF THE INVENTION

The technical problem to be solved by the invention is to overcome the defect in the prior art that conversion devices are required to be arranged on the land independently and provide a platform for collecting marine energy sources capable of effectively collecting various marine energy sources without occupying the land surface.

The technical proposal adopted by the invention to solve the technical problem is that: a platform for collecting marine energy sources is provided, which comprises solar energy collecting devices, wind energy generating devices and tidal generating devices and also comprises electric energy gathering devices for gathering and outputting electric energy output by the collecting devices or the generating devices; the devices are arranged on the platform on the sea surface; and the platform comprises a support partially submerged under the sea surface, a table arranged on the support, and a mounting bracket arranged on the table and used for placing the solar energy collecting devices and the wind energy generating devices.

In the platform for collecting the marine energy sources provided by the invention, the support is formed by a plurality of hollow tubes connected with each other; inner spaces of a plurality of the hollow tubes are communicated with each other; and the support also comprises an inlet which connects the inner spaces and outer spaces of the hollow tubes.

In the platform for collecting the marine energy sources provided by the invention, the platform also comprises a positioning and adjusting device which is connected to the support and used for fixing the position of the platform on the sea surface and adjusting the depth of the support into the sea.

In the platform for collecting the marine energy sources provided by the invention, the positioning and adjusting device comprises heavies which contact the seabed at a position at which the platform is arranged, driving units which are arranged on the platform, and cables which connect the heavies and the driving units respectively; and the driving units are used for adjusting the length of the cables.

In the platform for collecting the marine energy sources provided by the invention, the platform is provided with a tidal channel for sea waves to pass through and be strengthened; the tidal generating devices are arranged inside the tidal channel; and the tidal channel is positioned or partially positioned on the sea surface.

In the platform for collecting the marine energy sources provided by the invention, the mounting bracket comprises an arc top which is arranged on the table and connected with the table through a plurality of pillars.

In the platform for collecting the marine energy sources provided by the invention, photovoltaic cells of the solar energy collecting devices are arranged on the outer surface of the arc top.

In the platform for collecting the marine energy sources provided by the invention, each wind energy generating device comprises a plurality of blades for collecting wind energy and a power generation device; and the blades are arranged under an edge of the arc top.

In the platform for collecting the marine energy sources provided by the invention, an air pressure stabilizing unit which is opened when the air pressure in the arc top is more than the set value and closed when the air pressure in the arc top is less than the set value is arranged on the top of the arc top.

In the platform for collecting the marine energy sources provided by the invention, the air pressure stabilizing unit comprises an air outlet which is arranged at a vertex of the arc top and a removable cover of which the shape is matched with that of the air outlet of the arc top.

The platform for collecting the marine energy sources provided by the invention has the advantages that: as the energy collecting devices or the generating devices are arranged on one platform which is arranged on the sea surface, various marine energy sources can be collected effectively and safely and the conversion devices do not occupy land resources.

BRIEF DESCRIPTION OF THE DRAWINGS

FIG. 1 is a structure diagram of an embodiment for a platform for collecting marine energy sources provided by the invention.

DETAILED DESCRIPTION OF THE PREFERRED EMBODIMENTS

Further description is given below to the embodiment of the invention with the attached drawings.

As illustrated in FIG. 1, in the embodiment for the platform for collecting the marine energy sources provided by the invention, the platform for collecting the marine energy sources comprises the platform and energy conversion devices arranged on the platform, wherein the platform comprises a support 1 partially submerged under the sea surface, a table arranged on the support 1, and a positioning and adjusting device for adjusting the depth of the support 1 into the sea. In the embodiment, the adjusting device comprises driving units 8, cables 9 and heavies 10, wherein the heavies 10 contact the seabed at which the platform is positioned; and the cables 9 are connected to the heavies 10 respectively and also connected with the driving units 8 respectively. When the depth of the support 1 into the sea is required to be adjusted, the driving units 8 operate to tighten or loosen the cables 9, so that more or less part of the support 1 is allowed to be submerged into the sea. In the embodiment, the driving units 8 are motors. Moreover, a table (not illustrated in the FIGURE) is arranged on the support 1. Most devices in the embodiment are arranged on the front or at the rear of the table, and the front or rear of the table refers to the surface of the table away from or close to the sea surface.

Meanwhile, in the embodiment, the platform also comprises energy collection or conversion devices which or most of which are arranged on the table, including solar energy collecting devices (partial units of the solar energy collecting devices are illustrated in FIG. 1 and are actually photovoltaic cells or solar cells 4), wind energy generating devices 5 and tidal generating devices. Of course, the platform also comprises electric energy gathering devices (not illustrated in the FIGURE) for gathering and outputting electric energy output by the collecting devices or the generating devices.

The support 1 in the embodiment is formed by a plurality of hollow tubes which are connected with each other; hollow parts of the tubes are communicated with each other to form an inner space 11 of the support 1; an inlet 12 for connecting an outer space and the inner space of the support 1 is also reserved on the tubes; and water can enter into the inner space 11 from the inlet 12 and be used as a weight of the support.

In the embodiment, the platform is provided with a tidal channel 6 for sea waves to pass through and be strengthened, and the tidal generating devices are arranged inside the tidal channel 6 (not illustrated in FIG. 1). As illustrated in FIG. 1, the tidal channel 6 is partially positioned on the sea surface 7, namely one part of the channel is under water while the other part of the channel is on the water. The speed of tides is strengthened after the tides pass through the tidal channel 6, and the tidal generating devices (not illustrated in the FIGURE) are driven to generate power.

Moreover, in the embodiment, the table is also provided with an arc top 2 which is arranged on the table and connected with the table through a plurality of pillars 3. The photovoltaic cells of the solar energy collecting devices are arranged on the outer surface of the arc top 2 and used for converting solar energy into electric energy which is sent out by the electric energy gathering devices or lines arranged on the table.

In the embodiment, each wind energy generating device comprises a plurality of blades for collecting wind energy and a power generation device, wherein the blades are arranged under an edge of the arc top 2. Moreover, an air pressure stabilizing unit which is opened when the air pressure in the arc top is more than the set value and closed when the air pressure in the arc top is less than the set value is also arranged on the top of the arc top and comprises an air outlet which is arranged at a vertex of the arc top and a removable cover of which the shape is matched with that of the air outlet of the arc top. In the embodiment, when the offshore wind power is large, the removable cover is jacked up by the pressure in the arc top 2, which is then output through the air outlet, so that the pressure in the arc top 2 may not be too high. The objective of the arrangement is that: when the offshore wind power is large but the platform has large volume or a platform with large area is formed by a plurality of platforms with small volume connected with each other, the pressure in the platform must be kept in a stable value, or else, the platform may be affected by the large wind power.

The embodiment only indicates several implementations of the invention. While the embodiment is described in detail, it should be understood by those skilled in the art that the detailed description is not intended to limit the scope of protection of the invention. Moreover, it should be understood by those skilled in the art that various changes and improvements may be made without departing from the concept of the invention and should be all within the scope of protection of the invention. Therefore, the scope of protection of the invention should be determined by the appended claims.

What is claimed is:

1. A platform for collecting marine energy sources, comprising:

- an arc top supported by a plurality of pillars,
- solar cells arranged on an upper, outer surface of the arc top,
- wind energy generating devices arranged under the arc top,
- a support partially submerged under the sea surface formed by a plurality of hollow tubes connected with each other such that inner spaces of the plurality of the hollow tubes are in fluid communication with each other and the support further comprising an inlet which connects the inner spaces and outer spaces of the hollow tubes such that water can enter the inner spaces and act as ballast weight of the support,
- a tidal channel for sea waves to pass through, having a circular cross-section, and arranged within the support partially below the sea surface and partially above the sea surface, and
- a positioning and adjusting device comprising:
  - heavies configured to contact the seabed at a position at which the platform is arranged,
  - driving units arranged on the support, and
  - cables connecting the heavies and respective driving units, wherein the driving units adjust a length of each cable so as to fix a position of the platform on the sea surface and adjust a depth of the support under the sea surface.

2. The platform for collecting marine energy sources of claim 1, wherein the arc top comprises an air pressure stabilizing unit which opens when air pressure in the arc top exceeds a set value so as to release excess air pressure in the arc top.

3. The platform for collecting marine energy sources of claim 2, wherein the air pressure stabilizing unit comprises an air outlet and a removable cover.

4. The platform for collecting marine energy sources of claim 2, wherein the air pressure stabilizing unit is arranged at a vertex of the arc top.

* * * * *